United States Patent [19]

Gagnoud et al.

[11] Patent Number: 5,077,763
[45] Date of Patent: Dec. 31, 1991

[54] MECHANISM FOR MEASURING THE SERVICE TIMES OF SOFTWARE AND HARDWARE COMPONENTS IN COMPLEX SYSTEMS

[75] Inventors: Andre Gagnoud; Pierre Pignal, both of La Gaude, France

[73] Assignee: International Business Machines Corporation, Armonk, N.Y.

[21] Appl. No.: 618,869

[22] Filed: Nov. 28, 1990

[30] Foreign Application Priority Data

Dec. 6, 1989 [EP] European Pat. Off. ......... 89480183.6

[51] Int. Cl.$^5$ ............................................. G06F 11/30
[52] U.S. Cl. ........................................ 377/16; 377/20; 377/26; 364/551.01
[58] Field of Search ..................... 377/16, 13, 20, 26; 364/550.01

[56] References Cited

U.S. PATENT DOCUMENTS

| | | | |
|---|---|---|---|
| 4,126,895 | 11/1978 | Weemaes et al. | 364/200 |
| 4,339,657 | 7/1982 | Larson et al. | 377/16 |
| 4,566,101 | 1/1986 | Skonieczny et al. | 377/16 |
| 4,719,587 | 1/1988 | Berte | 364/551.01 |
| 4,817,118 | 3/1989 | Wilburn et al. | 377/26 |
| 4,881,184 | 11/1989 | Abegg et al. | 364/551.01 |
| 4,974,238 | 11/1990 | Kobayashi et al. | 377/16 |
| 5,023,817 | 6/1991 | Au et al. | 377/16 |

Primary Examiner—John S. Heyman
Attorney, Agent, or Firm—Edward H. Duffield

[57] ABSTRACT

A measurement mechanism which can be implemented in any complex system for measuring the service times required for carrying out specified operations is described for a system having a plurality of components working in pre-emptive mode so that an operation once started by a component can be suspended to perform other operations which are requested by the same or other components if these operations have higher priority levels. The measurement mechanism includes a current status register 16 in which the system causes a status value to be stored representative of the current operation being performed by the system. It also includes a reference status register 18 in which a reference value representative of the operation to be measured is stored. These values are compared through a compare logic circuit under control of a filtering value stored in another register. When a match is detected by the compare circuit, the content of a counter is incremented. At the end of the measure, the content of the counter is transferred into another register, the content of which represents the measured value. By selecting the filtering value any specified partial or total service time can be directly measured.

9 Claims, 2 Drawing Sheets

MECHANISM FOR MEASURING THE SERVICE TIMES OF SOFTWARE AND HARDWARE COMPONENTS IN COMPLEX SYSTEMS

DESCRIPTION OF THE INVENTION

1. Field of the Invention

The present invention relates to a mechanism to be implemented in complex systems comprised of software and hardware components giving the systems the capability of performing various types of operations. The mechanism allows the partial or total service times of any piece of software or hardware to be measured. It is more particularly applicable to multi-task systems working under severe real time constraints with pre-emptive policies.

2. Background Art

To measure the performance of complex systems, there is a need to determine with high precision the path lengths, i.e. the service times of specified pieces of software or hardware performing specified processes (software) or specified operations (hardware). In systems working with pre-emptive policies, a process or operation may be pre-empted by another process or operation whose execution has a higher priority level. If it is desired to measure the service time of a specified interruptible process or operation, the presently known mechanisms are inadequate.

U.S. Pat. No. 4,126,895 relates to a system for monitoring the free time of a processor at predetermined intervals. A count is maintained as to the state of the processor at each monitoring with values "free" or "occupied" and the workload is regulated when the free time count is found to be outside upper and lower limits. The regulation takes the form of periodically limiting or increasing the work input to the processor.

This known system only deals with the achievement of a trivial measure, i.e. the workload, and ignores complex measures which are of interest in real-time systems, such as the service times or path lengths which represent the times needed to accomplish a specified service.

In addition, this system only manages non pre-empted policies and therefore provides only rough approximations that may lead to errors in interpretation.

The article published in the IBM Technical Disclosure Bulletin Vol. 10, No. 8, January 1968 at pages 1184 to 1186 describes a system for monitoring the duration of activities within various sections of a data processing system.

This system does not enable monitoring of partial software functions within a given hardware component. This is due to the fact that the elementary information capture is related only to the "busy status" of a given hardware component, regardless of the details of the software component running on that hardware component.

In modern systems, there are several details of a given software that need to be distinguished: hierarchical layers (such as in the ISO standard), sequential phases (such as the execution phase and the commit phase in an atomic protocol of a transaction processing system), different languages (such as a high level language for the data processing and an assembly language for the device drivers that interconnect the hardware in an operating system . . . ).

The TDB referenced system requires a voluminous number of hardware components (9 counters) to monitor a small machine configuration, having 1 CPU and 3 channels. This is due to the fact that each counter has to perform a specified function and is to be pulsed at an appropriate time.

For modern systems, such as current communication controllers, this monitor would need to have a huge number of counters to measure an average number of parameters with an average precision. Hence, the complexity of such a system increases rapidly as the complexity of the system to be measured increases.

Furthermore, the present monitor is inappropriate as soon as the system to be measured contains a given level of integration.

OBJECTS OF THE INVENTION

An object of the present invention is to provide a mechanism for accurately measuring the service times of specified pieces of software or hardware components in a system working with pre-emptive policies.

Another object of the present invention is to provide such a mechanism which is non disruptive, i.e. which does not disturb the system under measurement.

Another object of the present invention is to provide such a mechanism which provides for an automatic selection of the factors to be measured, so that it offers a high degree of flexibility.

BRIEF SUMMARY OF THE INVENTION

The mechanism according to the present invention is used for measuring the service times required for carrying out specified operations (including software process, hardware operation, etc.) in a system comprising a plurality of components and working in pre-emptive mode so that an operation once started by a component can be suspended to perform other operations which are requested by the same or other components if these operations have higher priority levels. The measurement mechanism comprises:

first storing means in which the system causes a current value representative of the current operation being carried out by the system, to be stored, selection means for establishing measurement conditions representative of the operation the service time of which is to be measured and of a precise context in which the measure is to be carried out, comparing means which are responsive to the current value and to the measurement conditions to generate an active signal when there is a match between the current value and the measurement conditions, pulse generating means providing elementary counting pulses, counting means responsive to the active signal from the comparing means for counting the elementary counting pulses over a time predetermined by the selection circuit.

It also comprises an output register. The measurement selection means sets the counting means at an initial value (0) when the measure is started and causes the content of the counting means to be stored in the output register at the end of the measurement.

In a preferred embodiment of the invention the selection means comprises:

measurement selection means, second storing means in which the measurement selection means loads a reference value representative of the operation the service time of which is to be measured, filtering means which are set by the measurement selection means to a filtering status which determines the operations the service times of which have to be included or excluded from the service time to be measured, the reference value and filtering status constituting the measurement conditions, and the comparing means are responsive to the current value, to the reference value and to the filtering status to generate the active signal when there is a match between the current value and the reference value as determined by the filtering status.

DETAILED DESCRIPTION OF THE INVENTION

An information handling system or data processing system can be represented as an assembly of software and hardware components, each component performing a given service at a unique priority level. The carrying out of a service by a given component can be pre-empted i.e. disturbed by a request for service originating from another component.

The mechanism according to the present invention allows measuring the service times of selected components. The service time is in fact the service path length when measured between the start and the exit of a given instance of service or the partial system resource utilization when measured between absolute time pulses such as over 100 millisecond or 10 millisecond intervals.

The measurement mechanism has the advantage of allowing any piece of service to be filtered so as to remove or keep at will the "pollution" on the measured service due to the preemptions such as interrupts or cycle steal operations.

Figure 1:
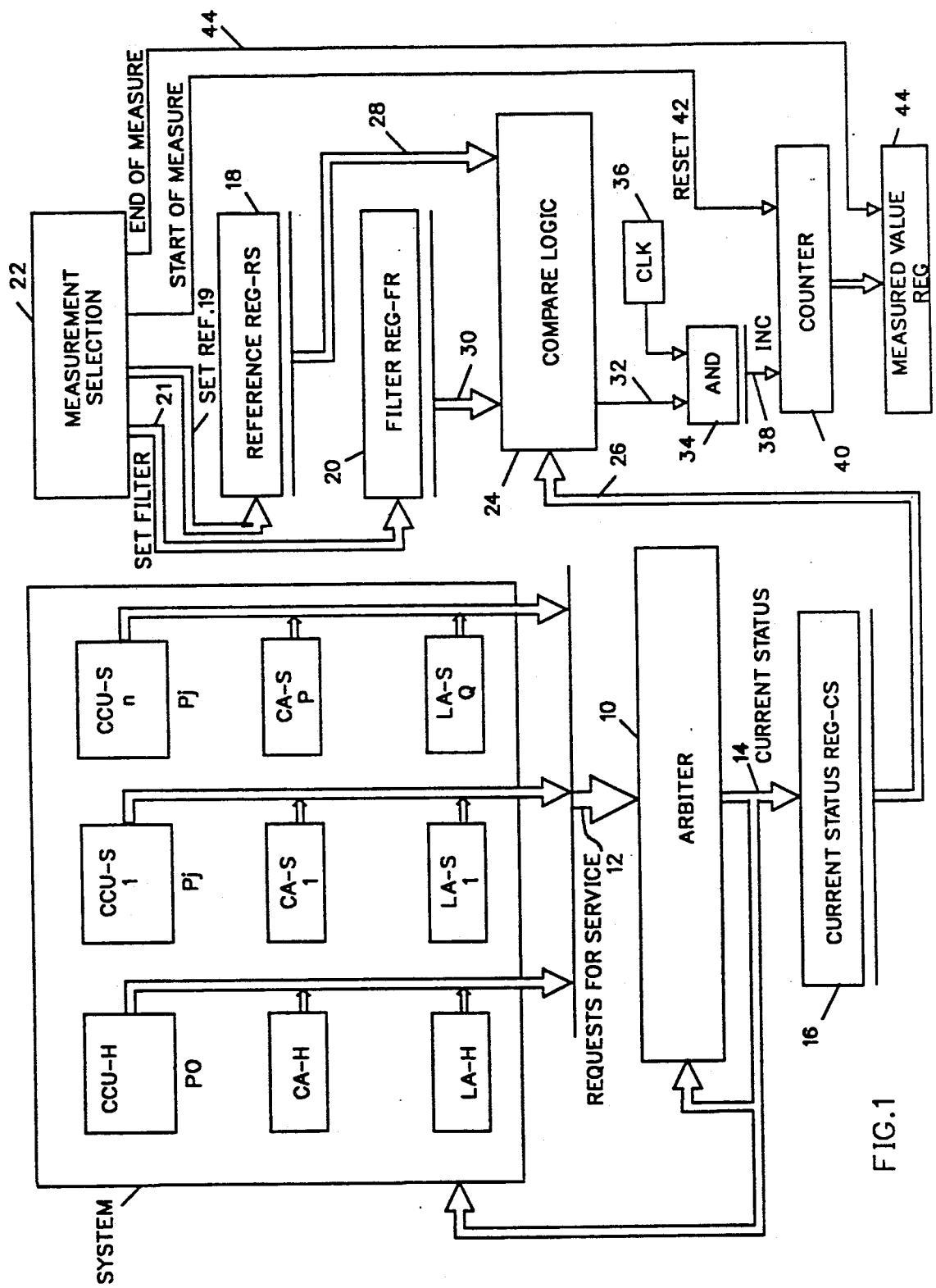
FIG. 1 represents the block diagram of the mechanism according to the present invention.

FIG. 1 schematically represents the component arrangement in a communication controller of the IBM 3745 type.

Basically, such a controller comprises at least one central control unit CCU, a plurality of channel adapters CA and a plurality of line adapters LA.

The central control unit CCU is comprised of one hardware component referenced CCU-H and n software components referenced CCU-S1 to CCU-Sn. Only one channel adapter is shown in FIG. 1; it comprises one hardware component CA-H and p software components CA-S1 to CA-Sp. Only one line adapter is shown in FIG. 1, it comprise one hardware component LA-H and q software components LA-S1 to LA-Sq.

Each component has its own priority level Pj, with j=0 to j=5, P0 being the highest priority level and P5 being the lowest priority level. The hardware components have the highest priority level, P0.

All the components raise requests for service to an arbitrating device 10 through a request for service bus 12. Arbitrating device 10 compares the priority level of the request being serviced as indicated by the current status information on an output bus 14 of the arbitrating device, with the priority levels of the requests present on bus 12. It determines whether the current process can be pursued or has to be suspended to service a request having a higher priority. As is conventional, the arbitrating device 10 comprises a pending request queue (not shown) to hold the pending requests which are taken into account at each selection time so as to provide them a chance to be serviced.

In a telecommunication system, each software component is considered from a logical point of view as an assembly of layers (as defined by the Open System Interconnection OSI architecture or by the Systems Network Architecture SNA), each layer providing a partial contribution to the specified global service of the component. Also the function of a layer may be performed by several components.

In such an environment, it is of interest to measure the service time corresponding to the partial function of a specified layer performed by a specified component or the total function of a layer performed by several components.

The mechanism of the present invention allows any type of measures to be made in a programmable way as will be described later on.

The arbitrating device 10, selects the component inside the system which is activated to serve the selected request for service at a given time. Such a device may be a hardware device or software device and will not be described in detail since it is not part of the subject invention.

The components which are raising requests for service send their requests identifying the requester component and the request server component to the arbitrating device 10 through bus 12. The arbitrating device selects the request to be serviced and if necessary updates the current status information on bus 14. The current status information is stored in current status register 16.

Figure 2:
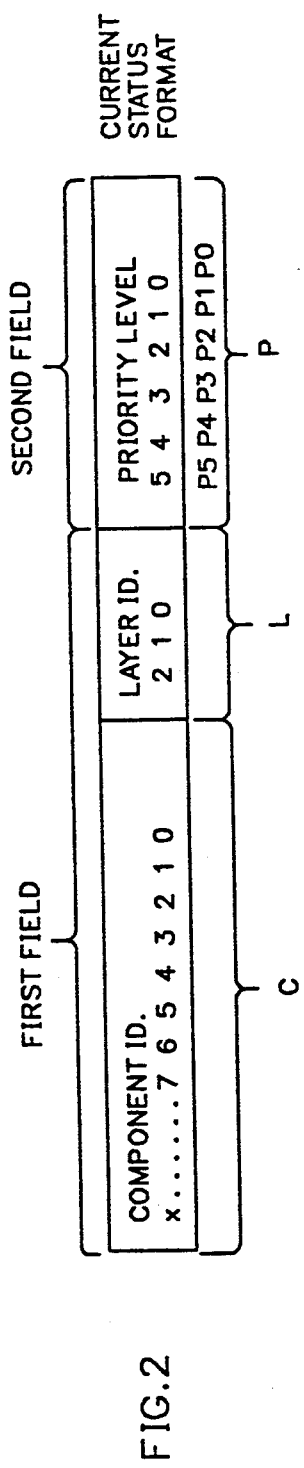
FIG. 2 represents the format of the current status register.

As shown in FIG. 2, the current status in register 16 comprises two fields:

a first field for identifying the selected server component by means of a component identification subfield C and a layer identification subfield L.

a second field P for identifying the priority level of the server component.

The component identification subfield comprises as many bits as necessary to identify each component of the system and the layer identification subfield comprises three bits (since actually there are seven identified layers to be considered).

In a preferred embodiment of the invention the second field comprises six bits with one bit assigned to each priority level P0 to P5 to code the preemption levels separately with one preemption level per bit. This enables knowledge of which level is pre-empted by which level. Assuming that the priority level of the selected server component is level P2, the priority level bits in the second field will be set to 0 0 0 1 0 0.

Obviously, any other encoding of these fields can be used.

The current status information on bus 14 is provided to the system so as to activate the selected server component.

The counter size is designed in such a way as to allow the pulses for the largest service time to be counted.

The mechanism according to the present invention makes use of the current status information in the current status register 16. It also comprises a reference value register 18 and a filtering register 20 which are loaded by means of a measurement selection circuit 22, through busses 19 and 21 under control of an operator.

The reference value which characterizes a desired measure is known to the operator or is derived from a set of measures prepared in advance in a table of measurement inside the system to be measured. The reference value is loaded into the reference register 18. In a preferred embodiment of the invention, the format of the reference register is identical to the format of the current status register shown in FIG. 2.

The filtering register 20, which also has the same format as the current status register, is loaded with a filtering status chosen by the operator. This status determines precisely which measure is desired.

The reference value and the filtering status which, acts as a mask pattern, represent the conditions in which the measure is to be carried out.

The contents of registers 16, 18, 20 are provided to a compare logic circuit 24 through busses 26, 28, 30. This logic circuit provides an active signal on its output line 32 depending upon the values contained in registers 16, 18 and 20 as will be described later.

Line 32 is provided to an input of AND gate 34. The other input of AND gate 34 is connected to a clock 36 which generates time counting pulses.

In another embodiment of the invention where it is desired to get the service time expressed in number of instructions, the clock 36 can be replaced by a pulse generator which generates a pulse at each instruction execution.

Thus, AND gate 34, when conditioned by the active signal on line 32, gates the time counting pulses on its output line 38 to increment a counter 40. Counter 40 is reset by a signal on line 42 provided by measurement selection circuit 22 when a measure is started by the operator, the start of the service which is to be measured, or by hardware time pulses for resource utilization measurement. At the end of the measure provided by the exit of the service being measured or by hardware time pulses for resource utilization measurement, circuit 22 activates line 44 which causes the content of counter 40 to be loaded in register 44.

The content of register 44 represents the measured value which may be displayed or logged.

The filtering register 20 is a major part of the mechanism according to the subject invention. It is used to indicate the proper filtering conditions on the subset of software and hardware components to be observed. It allows consideration of only a subset of the bits in the current status register 16 and reference register 18 and checking for whether they are identical for the subset at a given time.

Whether the bits in filtering register 20 are coded positively or negatively by "1" or "0" or other conventions is only dependent upon the application of the invention. For the sake of example, it will be assumed that a "1" is set in the bit positions of the filtering register to indicate which bits of the current status register 16 and reference register 18 have to be taken into account in the comparison made by comparison logic circuit 24 in generating the active signal on line 32.

Figure 3:
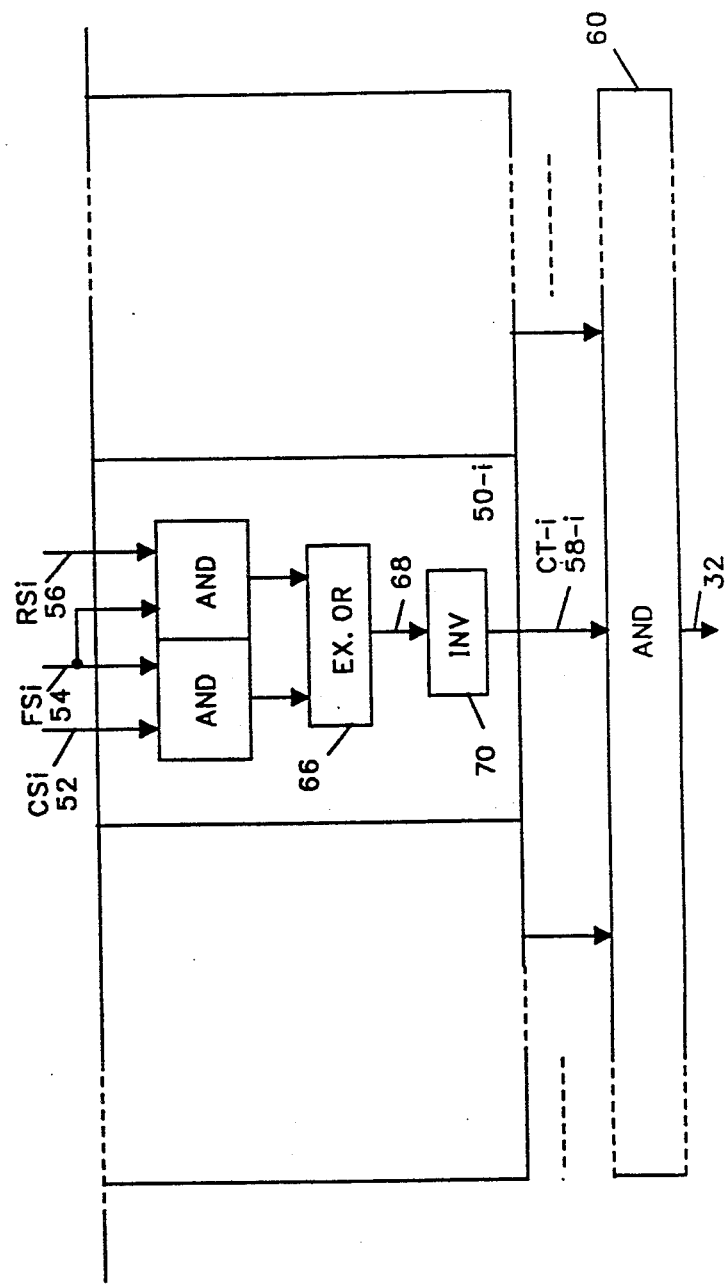
FIG. 3 represents a detailed implementation of comparing circuit 24 of FIG. 1.

A specific implementation of a comparison logic circuit 24 is shown in FIG. 3. It comprises a number of logic arrangements such as 50-i equal to the number of bits in registers 16, 18 and 20. Each logic arrangement has three input lines 52, 54 and 56, each one receiving the same order bits from registers 16, 20 and 18 referenced as current status bit CSi, filter status bit FSi and reference status bit RSi, respectively. Each logic arrangement 50-i provides a CTi signal on its output line 58-i. The output lines 58 of each logic arrangement are provided to AND gate 60, the output line of which is the line 32.

The truth table of logic arrangement 50-i is the following:

| FSi | CSi | RSi | CTi |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 0 |
| 1 | 1 | 0 | 0 |
| 1 | 1 | 1 | 1 |

When the filter bit FSi is set to 0, the CTi signal is set to 1, regardless of the values of the CSi and RSi bits. When the filter bit FSi is set to 1, the CTi bit is set to 1 only when there is a match between the CSi and RSi bits.

This can be represented by the Boolean equations:

$$CTi = NOT\,[(CSi.FSi) \oplus (RSi.FSi)]$$

. means AND operator
$\oplus$ means Exclusive OR operator.

To perform this function, logic arrangement 50-1 comprises two AND gates 62 and 64. The input lines of AND gate 62 are lines 52 and 54 and the input lines of AND gate 64 are lines 54 and 56. The output lines of AND gates 62 and 64 are connected to the inputs of Exclusive OR circuit 66. The signal on output line 68 of Exclusive OR circuit 66 is inverted by inverter 70 which provides the CTi output signal on line 58-i.

The operation of the mechanism represented in the FIGS. 1 and 3 is the following. Assuming that it is desired to measure the time service of a specific layer, for example layer 001 for a given component coded as C = ... 000110, at a priority level P5, excluding the time services corresponding to the other priority levels P0 to P4, the C field in reference register is set to C = ... 000110 the L field is set to 001 and the priority level field is set to 100000.

The filter register is set to all 1's, so as to measure only the specified service time (excluding all pollutions from pre-empting). Counter 40 will be incremented only when the contents of reference register 18 and current status register 16 match.

As another example, to perform a measure on the same component at a priority level P5, whatever the layer be, and including the service time corresponding to the priority levels P4 and P0 and excluding the priority levels P1, P2 and P3, the C fields in reference register 18 and in filter register 20 are set to the same value as previously. The layer field L in the registers 18 and 20 are set to 000 and the priority level in the reference register 18 is set to 100000 and in filter register 20 it is set to 101110, so as to account for P5, P1, P2, P3 and ignore P0 and P4.

By setting the values in registers 18 and 20 any desired partial or total measure can be performed.

Though the present invention has been described as implemented in a communication controller, it will be obvious for the man skilled in the art to implement such a mechanism in other fields such as the chemical engineering field or medical field.

The measured value can be used for any purpose such as performance measurement of a system, statistics, signalling of a specified system state, statistics, network management, etc., wherefore what is claimed is:

I claim:

1. A mechanism for measuring the service times required for carrying out specified operations in a system comprising a plurality of components and working in pre-emptive mode so that an operation once started by a component can be suspended to perform other operations which are requested by the same or other components if these operations have higher priority levels, said mechanism being characterized in that it comprises:

first storing means (16) in which the system causes a current value representative of the status of the current operation being carried out by the system to be stored, selection means (22, 18, 20) for establishing measurement conditions representative of the operation the service time of which is to be measured and of a precise context in which the measure is to be carried out, comparing means (24) which are responsive to the current value, and to the measurement conditions to generate an active signal when there is a match between the current value and the measurement conditions, pulse generating means (36) providing elementary counting pulses, counting means (40) responsive to the active signal from the comparing means for counting the elementary counting pulses over a time predetermined by the selection means.

2. A mechanism according to claim 1 characterized in that the selection means comprise:

measurement selection means (22), second storing means (18) in which the measurement selection means (22) loads a reference value representative of the operation the service time of which is to be measured, selection means (20) which are set by the measurement selection means to a filtering status which determines the operations the service times of which have to be included or excluded from the service time to be measured, the reference value and filtering status constituting the measurement conditions, and in that the comparing means are responsive to the current value, to the reference value and to the filtering status to generate the active signal when there is a match between the current value and the reference value as determined by the filtering status.

3. A mechanism according to claim 1 characterized in that it comprises an output register (44) and in that the selection means sets the counting means at an initial value (0) when the measure is started and causes the content of the counting means to be stored in the output register at the end of the measurement.

4. A mechanism according to claim 2 characterized in that it comprises an output register (44) and in that the selection means sets the counting means at an initial value (0) when the measure is started and causes the content of the counting means to be stored in the output register at the end of the measurement.

5. A mechanism according to claim 2 or 3 characterized in that the first and second storing means comprise first and second registers having an equal number of storing positions, each position of the first and second registers is assigned to the storing of a bit of a binary representation of the current value and reference value respectively.

6. Mechanism according to claim 5 characterized in the binary representation of the current value comprises at least a first field identifying the component performing the current operation and a second field identifying the priority level of the current operation and the binary representation of the reference value comprises at least a first field identifying the component performing the operation the service time of which is to be measured and a second field identifying the priority level of the operation the service time of which is to be measured.

7. Mechanism according to claim 4 characterized in that the selection means comprise a third register having a number of storing positions equal to the number of storing positions of the first and second registers.

8. Mechanism according to claim 6, characterized in that the measurement selection means set in the third register a binary value representative of the filtering status, which determine which bits in the storing positions of the first and second registers have to be taken into account for generating the active output signal at the output of the comparison means.

9. Mechanism according to claim 7, characterized in that the comparison means comprises:

a number of elementary logic circuits (50-i) equal to the number of storing positions of the first, second and third registers, each elementary logic circuit being responsive to the bits in the same positions in the first, second and third registers to generate an output signal which is active if the bit in the third register is at a first binary value (0) whatever the value of the bits in the first and second registers be or if the bit in the third register is at a second value (1) and the binary values of the bits in the first and second registers match, an output circuit (60) responsive to the output signals from the elementary logic circuits for generating the active signal on its output line when all the output signals from said elementary logic circuits are active.

* * * * *